United States Patent [19]

Trage et al.

[11] Patent Number: 5,595,063
[45] Date of Patent: Jan. 21, 1997

[54] DEVICE AND METHOD FOR DEGASSING MAKE-UP WATER FOR A STEAM TURBINE PROCESS

[75] Inventors: Burkhard Trage, Ratingen; Richard Leitz, Hilden, both of Germany

[73] Assignee: BDAG Balcke-Durr Aktiengesellschaft, Ratigen, Germany

[21] Appl. No.: 282,035

[22] Filed: Jul. 28, 1994

[30] Foreign Application Priority Data

Mar. 9, 1994 [DE] Germany .................. 44 07 843.9

[51] Int. Cl.⁶ .................. B01D 19/00; F01K 7/00; F01K 19/00
[52] U.S. Cl. .................. 60/688; 261/112.1; 261/153
[58] Field of Search .................. 60/685, 688; 261/112.1, 261/108, 153, DIG. 10, DIG. 32, DIG. 76

[56] References Cited

U.S. PATENT DOCUMENTS

| | | | |
|---|---|---|---|
| 1,581,098 | 4/1926 | Byer | 261/108 |
| 2,566,732 | 9/1951 | Krieg | 60/688 |
| 4,801,314 | 1/1989 | Andrieux et al. | 261/115 |
| 4,981,113 | 1/1991 | Kannan et al. | 122/441 |

FOREIGN PATENT DOCUMENTS

| | | |
|---|---|---|
| 0561012 | 9/1993 | European Pat. Off. . |
| 297804 | 6/1916 | Germany . |
| 4022544 | 1/1992 | Germany . |

*Primary Examiner*—Leonard E. Heyman
*Attorney, Agent, or Firm*—Robert W. Becker & Associates

[57] ABSTRACT

In a method for degassing make-up water for a water-steam-circuit of a steam turbine process make-up water is introduced at a location of introduction into an exhaust steam pipe of the steam turbine so as to form a water film. A connector of the exhaust steam pipe is positioned in the vicinity of the location of introduction and connected to an evacuating device. The gases released from the make-up water are removed via the connector and the evacuating device. The device for performing the method has an exhaust steam pipe with an inner wall and free ends. At least one overflow trough including a deflecting shield is connected to the inner wall of the exhaust steam pipe. Closure plates are connected to the free ends of the exhaust steam pipe. The deflecting shield, the closure plates, the inner wall, and the overflow trough delimit a chamber having an opening toward the interior of the exhaust steam pipe only at the lower free edge of the deflecting shield.

9 Claims, 2 Drawing Sheets

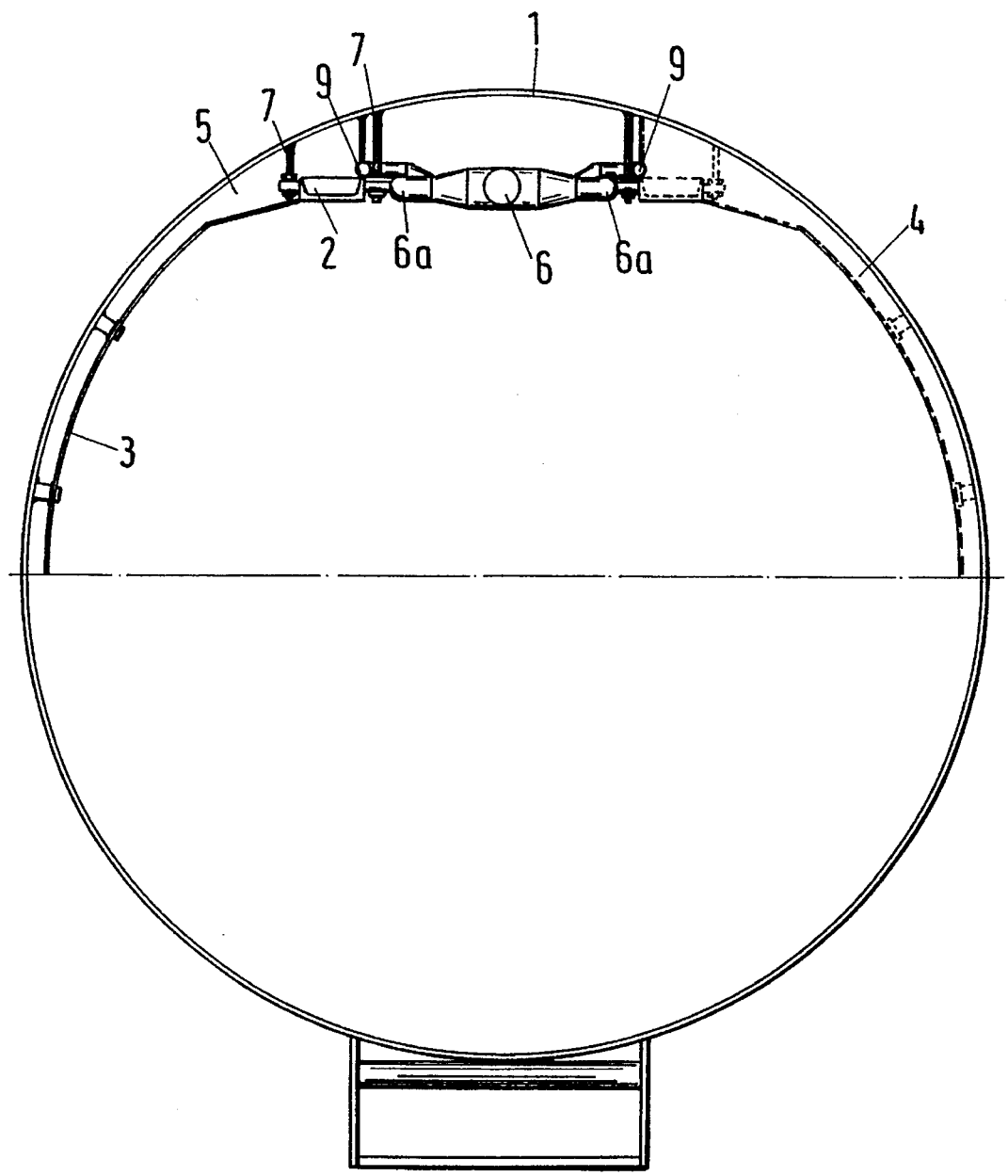

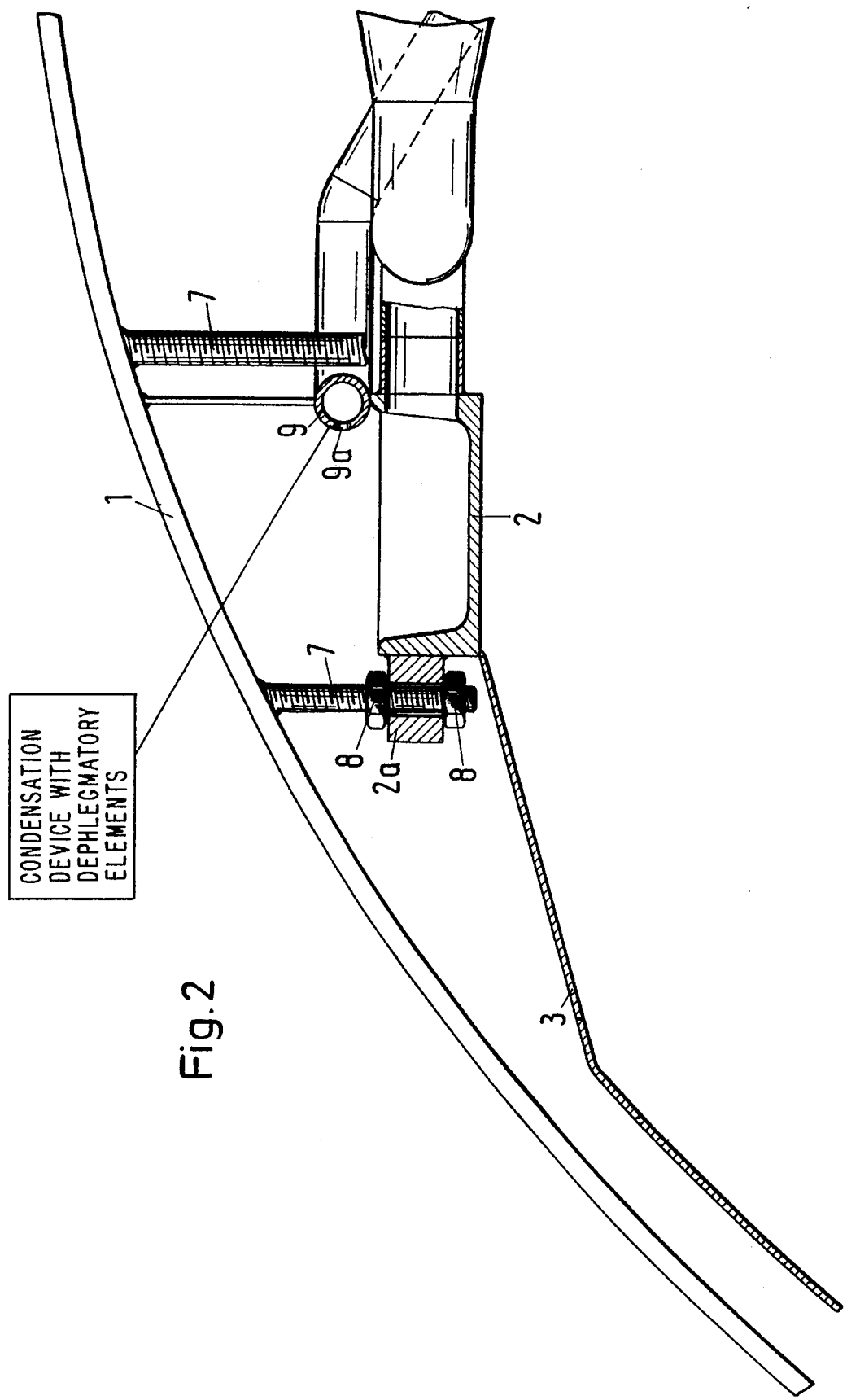

DEVICE AND METHOD FOR DEGASSING MAKE-UP WATER FOR A STEAM TURBINE PROCESS

BACKGROUND OF THE INVENTION

The present invention relates to a method for degassing make-up water for the water-steam-circuit of a steam turbine process of a power plant as well as a device for performing the method.

Due to unpreventable steam and water losses within the water-steam-circuit of a steam turbine process it is necessary to supply make-up water to maintain the required amount of water within the circuit. This make-up water must be degassed before being introduced into the water-steam-circuit. For this purpose, special degassing units are provided in which the make-up water is brought to the boiling point by supplying additional energy, for example, in the form of steam branched off the steam circuit of the process, and in this manner the gases contained within the water are released.

It is an object of the present invention to provide a method for degassing with which a supply of additional energy for the degassing step of the make-up water is not needed so that the efficiency of the complete process is increased.

SUMMARY OF THE INVENTION

The method for degassing make-up water for a water-steam-circuit of a steam turbine process of a power plant is primarily characterized by the steps of:

Introducing at a location of introduction make-up water into an exhaust steam pipe of a steam turbine so as to form a water film;

Positioning a connector of the exhaust steam pipe in the vicinity of the location of introduction;

Connecting the connector to an evacuating device; and

Removing gases released from the make-up water via the connector and the evacuating device.

Preferably, the inventive method further comprises the step of preheating the make-up water before the step of introducing.

Expediently, in the step of preheating the make-up water is preheated by steam flowing within the exhaust steam pipe upstream of the location of introduction of the make-up water.

In another embodiment of the present invention, the evacuating device is part of an air-cooled condensation device. Preferably, the connector in this embodiment is connected to supply lines of dephlegmatory elements of the air-cooled condensation device.

The present invention further relates to a device for degassing make-up water for a water-steam-circuit of a steam turbine process of a power plant, wherein at a location of introduction make-up water is introduced into an exhaust steam pipe of a steam turbine so as to form a water film, a connector of the exhaust steam pipe is positioned in the vicinity of the location of introduction and connected to an evacuating device, and gases released from the make-up water are removed via the connector and the evacuating device. The inventive device is primarily characterized by:

An exhaust steam pipe with an inner wall and free ends;

At least one overflow trough comprising a deflecting shield, the at least one overflow trough connected to the inner wall of the exhaust steam pipe;

Closure plates connected to the free ends of the exhaust steam pipe; and

Wherein the deflecting shield, the closure plates, the inner wall, and the overflow trough delimit a chamber having an opening toward an interior of the exhaust steam pipe only at a free edge of the deflecting shield.

Preferably, the device further comprises a suction line positioned above the overflow trough for removing the gases released from the make-up water.

Expediently, the overflow trough is suspended in an adjustable manner.

Advantageously, the device further comprises a supply line for the make-up water that is positioned within the exhaust steam pipe. The supply line preferably has ribs.

According to the present invention, the makeup water is introduced into the exhaust steam pipe of the steam turbine by forming a thin water film and the released gases are removed via a connector of the exhaust steam pipe arranged within the vicinity of the location of introduction of the make-up water, whereby the connector is connected to an evacuating device.

The degassing of the make-up water thus no longer is performed by heating the make-up water to the boiling point by supplying useful working energy, for example, withdrawn from the steam circuit, but instead according to the present invention a thin liquid film, i.e., a water film, is formed within the exhaust steam pipe which is heated by the steam flowing within the exhaust steam pipe. The gases contained within the make-up water are thus released from the water by the fact that the make-up water is guided into the exhaust steam pipe in which it is brought to a temperature close to the boiling point without the need for additional useful working energy. The boiling temperature of the make-up water is at a low level because of the low pressure present within the exhaust steam pipe.

With the inventive method not only the supply of additional energy for degassing the make-up water, for example, by withdrawing energy from the steam circuit, into a special degassing device is no longer needed, but it is also advantageous that the energy contained within the exhaust steam, which commonly is wastefully released into the atmosphere via the condensation devices, is thus reduced and instead used for heating and thus degassing the make-up water. During this process, the make-up water is simultaneously brought to the condensate temperature so that also for this heating operation of the make-up water the use of additional energy is no longer needed. In the inventive method the saved amount of energy can be used as working energy for increasing the overall efficiency of the process. Due to the introduction of the make-up water into the exhaust steam pipe the conventionally required degassing devices are obsolete. Since the already present evacuating device is used for the removal of the gases released from the make-up water within the exhaust steam pipe, the use of an additional vacuum generator is also obsolete.

According to a further aspect of the present invention the make-up water can be preheated before introduction into the exhaust steam flow. This preheating step can be performed by auxiliary energy or, preferably, by introducing the make-up water into the stream of steam flowing within the exhaust steam pipe.

According to a further feature of the present invention the exhaust steam pipe is connected to the evacuating device of the condensation device in the vicinity of the location of introduction of the make-up water, whereby in a preferred embodiment of the invention the connector is connected to the supply lines of the dephlegmatory elements of the condensation device. This results in the advantage that steam from the exhaust steam pipe which is being removed with the gases released from the make-up water is condensed within the dephlegmatory elements of the condensation device. Accordingly, a loading of the evacuating device with entrained steam is prevented. A further the advantage is that the vacuum generator with its suction side is connected only to one pressure level.

The device for performing the inventive method is primarily characterized by arranging within the exhaust steam pipe an overflow trough with a deflecting shield connected thereto that together with the overflow trough, the inner wall of the exhaust steam pipe and additionally provided closure plates delimits a chamber that is open only within the area of the lower edge of the deflecting shield to the interior of the exhaust steam pipe. This inventive construction provides a reliable and energy-saving degassing of the make-up water with low constructive and parts expenditures.

In a preferred embodiment of the invention a suction line is arranged above the overflow trough which suction line is connected to the supply lines of the dephlegmatory elements of the condensation device positioned below the dephlegmatory elements.

In order to ensure the formation of a thin water film it is suggested with the present invention to suspend the overflow trough in an adjustable manner within the exhaust steam pipe so that the overflow trough after assembly can be exactly horizontally aligned with its overflow edge.

The supply line for the make-up water inventively can be positioned within the exhaust steam pipe and is preferably provided with ribs.

BRIEF DESCRIPTION OF THE DRAWINGS

The object and advantages of the present invention will appear more clearly from the following specification in conjunction with the accompanying drawings, in which:

FIG. 1 shows a cross-section of the exhaust steam pipe of a power plant in the vicinity of the location of introduction of the make-up water, shown in the left half in section and in the right half in an end view; and FIG. 2 shows an enlarged cross-sectional view of the left overflow trough with the deflecting shield connected thereto according to FIG. 1.

DESCRIPTION OF PREFERRED EMBODIMENTS

The present invention will now be described in detail with the aid of several specific embodiments utilizing FIGS. 1 and 2.

The exhaust steam pipe 1 connected between a steam turbine and an air-cooled direct condensation device is represented in cross-section in FIG. 1. The exhaust steam pipe 1 in the shown embodiment is provided in the upper area with two horizontally arranged overflow troughs 2 each having a deflecting shield 3. In the shown embodiment each deflecting shield 3 has the shape of a circular arc which extends over an arc segment of approximately 50° and is connected with a slantedly extending, planar connecting piece to the outwardly oriented underside of the overflow trough 2.

To the vertical edges (extending in a common plane) of the deflecting shields 3 closure plates 4 are connected so that the deflecting shields 3 together with the closure plates 4 and the inner wall of the exhaust steam pipe form a chamber 5 which is open only in the downward direction in the area of the lower free edges of each deflecting shield 3.

Via a supply line 6 make-up water is supplied to the overflow troughs 2 in order to compensate losses within the water-steam-circuit. The supply line 6 extends approximately horizontally in the upper portion of the exhaust steam pipe 1 and is connected via branch lines 6a to the respective overflow trough 2, as can be seen clearly in FIG. 2. Each overflow trough 2 is comprised of a U-shaped profile the outer leg of which is machined such that the make-up water can exit as a thin water film from the overflow trough 2 and is guided to the lower deflecting shield 3.

In order to achieve an exact horizontal alignment of the overflow trough 2, the troughs 2 are adjustably suspended. For this purpose threaded bolts 7 are arranged at the inner wall of the exhaust steam pipe 1 on which the overflow troughs 2 provided with support flanges 2a are height-adjustable by nuts 8.

To the inwardly oriented legs of each overflow trough 2 a suction line 9 provided with a suction opening 9a is connected which suction line is preferably connected to the non-represented supply lines of the dephlegmatory elements of the condensation device.

The make-up water, which is supplied via the supply line 6 and the branch lines 6a to the overflow troughs 2, exits as a thin water film from the respective overflow trough 2 and reaches the upper side of the deflecting shield 3 positioned below the overflow troughs 2. The water film running down along the deflecting shield 3 exhibits laminar flow and has a film thickness between 0.5 and 1 mm. The closure plates 4 prevent that the steam flowing within the exhaust steam pipe 1 ruptures or disrupts the water film. The water film in this manner reaches the lower edge of the respective deflecting shield 3. At this location the water film enters the area of steam flow. Thus, the water film in this area is partially ruptured by shearing stress forces and is entrained in the form of droplets. On the other hand, the water film will run off the inner wall of the exhaust steam pipe 1 so that the condensate will collect at the bottom of the exhaust steam pipe 1 from where it is introduced into the water-steam-circuit.

Due to the introduction of make-up water into the exhaust steam pipe, in which a low pressure is present, due to the heating of the water film by the deflecting shield 3 that is heated by the steam within the exhaust steam pipe, and optionally by heating the make-up water, preferably within a supply line 6 located within the exhaust steam pipe 1, the make-up water reaches quickly its saturation temperature so that the gases contained within the make-up water are released. These gases are removed in the upper part of the chamber 5 delimited by the deflecting shields 3, the closure plates 4, and the inner wall of the exhaust steam pipe 1 with the suction lines 9 arranged therein so that they can be removed on a shortest possible path from the exhaust steam pipe 1. When the suction lines 9 are connected to the supply lines of dephlegmatory elements of the condensation device, it is possible that with the gases removed steam is also removed which will be condensed within the dephlegmatory heat exchanger elements. It is furthermore advantageous in this context that the vacuum generator used for removing the gases from the make-up water is connected with its suction side only to one pressure level.

The present invention is, of course, in no way restricted to the specific disclosure of the specification and drawings, but also encompasses any modifications within the scope of the appended claims.

What we claim is:

1. A method for degassing make-up water for a water-steam circuit of a steam turbine process of a power plant, said method comprising the steps of:

introducing, at a location of introduction, make-up water into an exhaust steam pipe so as to form a water film;

connecting a suction line to the exhaust steam pipe in the vicinity of the location of introduction; and removing gases released from the make-up water via the suction line.

2. A method according to claim 1, further comprising the step of preheating the make-up water before said step of introducing.

3. A method according to claim 2, wherein, in said step of preheating, the make-up water is preheated by steam flowing within the exhaust steam pipe upstream of the location of introduction of the make-up water.

4. A device for degassing make-up water for a water-steam circuit of a steam turbine process of a power plant, wherein, at a location of introduction, make-up water is introduced into an exhaust steam pipe so as to form a water film, the exhaust steam pipe is connected to a suction line in the vicinity of the location of introduction, and gases released from the make-up water are removed via said suction line, said device for degassing comprising:

said exhaust steam pipe having an inner wall and free ends;

at least one overflow trough comprising a deflecting shield, said at least one overflow trough connected to said inner wall of said exhaust steam pipe;

closure plates connected to said free ends of said exhaust steam pipe; and wherein said deflecting shield, said closure plates, said inner wall, and said overflow trough delimit a chamber having an opening toward an interior of said exhaust steam pipe only at a lower free edge of said deflecting shield.

5. A device according to claim 4, further comprising a suction line positioned above said overflow trough for removing the gases released from the make-up water.

6. A device according to claim 4, wherein said overflow trough is suspended in an adjustable manner.

7. A device according to claim 4, further comprising a supply line for the make-up water, said supply line positioned within said exhaust steam pipe.

8. A device according to claim 4, further comprising an air-cooled condensation device to which said suction line is connected.

9. A device according to claim 4, wherein said air-cooled condensation device comprises dephlegmatory elements.

* * * * *